United States Patent Office 2,833,805
Patented May 6, 1958

2,833,805
DITHIOPHOSPHATE INSECTICIDES

William R. Diveley, Newark, Del., assignor to Hercules Powder Company, Wilmington, Del., a corporation of Delaware No Drawing. Application August 30, 1955
Serial No. 531,607

20 Claims. (Cl. 260—461)

This invention relates to new and useful organic dithiophosphate compounds and to pesticidal compositions containing the same.

The novel organic dithiophosphate compounds of this invention have the general formula

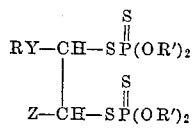

in which R represents a lower alkyl radical or lower alkoxyethyl radical, each R' represents a lower alkyl radical and Y represents oxygen or sulfur and Z represents hydrogen or RY.

These organic dithiophosphate compounds have pesticidal properties and distinguish themselves in being highly toxic at low concentrations toward certain pests.

The methods of making the products of this invention and methods of using the products as pesticides are more particularly described in the following examples in which all parts and percentages are by weight.

Example 1

To a stirred solution of 8.0 parts sodium hydroxide and 200 parts 100% ethanol was added dropwise 40.1 parts of 98% O,O-diethyl hydrogen phosphorodithioate. The mixture was cooled during the addition to keep the temperature below 30° C. Then 14.3 parts of 1,2-dichloroethyl ethyl ether was added dropwise and the mixture refluxed 36 hours. The salt was filtered off and the solvent removed from the filtrate under reduced pressure. The residue was taken up in benzene (200 parts), and the resultant solution washed with 5% potassium hydroxide and with water, then dried over anhydrous sodium sulfate. The solvent was removed under reduced pressure and the residue topped at 60° C./<1 mm. The residue, a tan liquid amounting to 30.9 parts was 1-ethoxy-1,2-ethanedithiol S,S-bis(O,O-diethyl phosphorodithioate). Analysis of product: found S, 30.6%.

An emulsifiable concentrate of the 1-ethoxy-1,2-ethanedithiol S,S-bis(O,O-diethyl phosphorodithioate) was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.025%. The dispersions were then tested for their toxicity to caged insects and to mites not only by spraying the insects but by spraying the plants alone as well for the purpose of determining residual toxicity. Standard test methods were used for obtaining the results set forth below.

When pea aphids were sprayed with a 0.025% emulsion of the composition of this example and placed on pea seedlings sprayed simultaneously with the same emulsion, there resulted 100% mortality in 48 hours.

Activity tests were also run by spraying lima bean seedlings infested with two-spotted mites to run off with 0.005% aqueous emulsion. There resulted 100% mortality to the mites after 5 days.

A 0.1% emulsion gave a 100% kill of caged flies and a 0.05% emulsion gave a 100% kill of Mexican bean beetles on lima bean seedlings.

Example 2

A solution of 6.0 parts 1,2-dimethoxy-1,2-dichloroethane (prepared following the procedure of Berichte der deutschen chemischen Gesellschaft 87, 906 (1954)), and 20 parts of benzene was added dropwise to a stirred solution of 10.25 parts diethyldithiophosphoric acid, 4.35 parts pyridine, and 50 parts benzene. After the addition was completed, the mixture was refluxed for 2 hours. The pyridine hydrochloride was filtered off and the filtrate washed with 15% sodium carbonate solution and water, then dried over anhydrous sodium sulfate. The solvent was removed under reduced pressure and the residue topped at 50° C./0.1 mm. The residue, a yellowish oily product which weighed 9.7 parts, was 1,2-dimethoxy-1,2-ethanedithiol S,S-bis(O,O-diethyl phosphorodithioate) as confirmed by analysis for phosphorus.

This product gave 100% kill of Mexican bean beetles, pea aphids and two-spotted mites at 0.1% concentration in emulsions tested as in Example 1.

Example 3

To 37.2 parts of O,O-diethyl hydrogen phosphorodithioate stirred at room temperature was added dropwise 19.3 parts of 30% aqueous glyoxal. The temperature rose slightly during the addition. After the addition was completed, the mixture was stirred at room temperature for two hours, then 12.4 parts of ethyl mercaptan was added dropwise. The reaction mixture was cooled during this addition to keep the temperature below 35° C. The mixture was stirred intermittently for 5 days at room temperature; it consisted of two phases. Diethyl ether (150 parts) was added and 0.12 equivalent of standard base was added to neutralize the acids in the resultant mixture. The ether layer was separated, washed neutral with water and dried over anhydrous sodium sulfate. The solvent was removed under reduced pressure and the residue topped at 40° C./<1 mm. Hg. The residue, a tan liquid product weighing 31 parts, was 1,2-bis(ethylthio)-1,2-ethanedithiol S,S-bis(O,O-diethyl phosphorodithioate) as confirmed by sulfur analysis.

This product gave 100% kill of pea aphids at 0.1%, 100% kill of two-spotted spider mites at 0.1%, and 100% kill of two-spotted spider mites and pea aphids at 0.005% (50 p. p. m.) in systemic tests.

Example 4

To a stirred solution of 10.2 parts 2-methoxyethyl vinyl ether and 40 parts carbon tetrachloride cooled at −10° C. was added dropwise a solution of 16.0 parts bromine and 10 parts carbon tetrachloride. The resultant mixture consisted primarily of 2-methoxyethyl 1,2-dibromoethyl ether in carbon tetrachloride. Another solution was prepared by the addition of 4.6 parts finely cut sodium to 200 parts 100% ethanol, followed by the dropwise addition of 39.1 parts of O,O-diethyl hydrogen phosphorodithioate. The temperature of the mixture was kept below 40° C. during the addition. The resultant alcoholic solution of sodium O,O-diethyl phosphorodithioate was added to the dibromide solution at 10° C., and the mixture heated at reflux for 24 hours intermittently over a 3 day period. The salt was filtered off and the solvent removed from the filtrate under reduced pressure. The residue was taken up in benzene, washed with 5% sodium bicarbonate and with water, then dried over anhydrous sodium sulfate. Removal of solvent under reduced pressure left a residue which was topped at 50°

C./<1 mm. The resultant residue, a tan liquid product which weighed 26 parts, was 1-(2-methoxyethoxy)-1,2-ethanedithiol S,S-(O,O-diethyl phosphorodithioate) as confirmed by analysis.

This product gave 100% kill of pea aphids at 0.05%, 100% kill of Mexican bean beetles at 0.1% and 100% kill of two-spotted mites at 0.1%.

*Example 5*

To a stirred solution of 7.4 parts of methyl vinyl sulfide and 35 parts of carbon tetrachloride cooled at −10° C. was added 16 parts of bromine. A solution of 40.6 parts of ammonium O,O-diethyl phosphorodithioate in 250 parts acetone was added dropwise to the dibromide solution at 10° C. The resultant mixture was stirred and refluxed 16 hours intermittently over a 2 day period. The salt was filtered off and the solvent removed under reduced pressure. The residue was taken up in benzene, washed with 5% sodium bicarbonate and with water, and dried over anhydrous sodium sulfate. Removal of the solvent left a residue which was topped at 50° C./<1 mm. The resultant residue, a tan liquid product amounting to 31.0 parts was 1-methylthio-1,2-ethanedithiol S,S-bis(O,O-diethyl phosphorodithioate) as confirmed by analysis.

This product had about the same toxicity as the product of Example 3.

Products related to the ethyl esters of Examples 1 to 5 in which the alkyl group in the dithiophosphoric acid part of the molecule varies from methyl through butyl are prepared from the corresponding dialkyl dithiophosphoric acids in which alkyl groups are methyl, isopropyl, and isobutyl by the reactions of these examples. The methyl esters are substantially as good as isopropyl esters in insecticidal screening tests. The ethyl esters were superior to the methyl esters. The compounds of the general formula in which R contains 2 carbons or less are more active than those containing more than 2 carbon atoms.

In producing compounds of this invention the general process is expressed by the following symbols in which X is chlorine or bromine

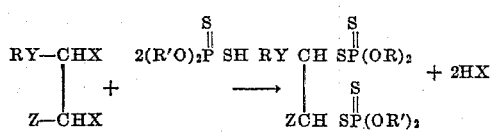

Substituted dihaloethanes of the formula

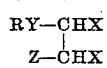

are produced by chlorination or bromination of the corresponding unsaturated compound, e. g., by chlorination or bromination of ROCH=CHZ or RSCH=CHZ. Compounds of the formula

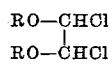

are prepared by the following reaction:

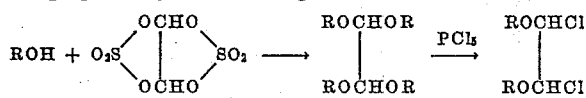

(Ber. 87,906 (1954)). Compounds of the general formula in which Y is S and Z is RS are prepared by the following reaction:

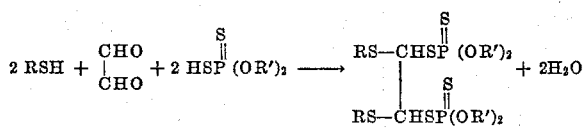

In general the reactions in which the substituted dichloroethane is reacted with a dialkyl dithiophosphoric acid are carried out by heating the two reactants at a temperature at which reaction takes place but below the decomposition temperature in the range of 20° to 200° C., preferably in the range of 30° to 110° C. The reactants may be mixed in any desired order. Preferably an excess of the dithiophosphoric acid is used in order to get complete reaction in the formation of a bis(phosphorodithioate). The ester of the dithiophosphoric acid used as a reagent is used in the form of its salts. However, in the case of the product of the general formula in which RY and Z are RO the ester of the dithiophosphoric acid may be used in the form of the free acid. In this case, the HCl may be driven off or combined with a sequestering agent. When the reaction is complete, the excess ester of the dithiophosphoric acid is readily removed by washing with water containing sufficient alkali to produce the water-soluble salt.

The reaction of the substituted dichloroethanes with dialkyl dithiophosphoric acids is preferably carried out in nonaqueous media. Organic solvents are desirable to aid in control of the reaction. Suitable solvents include benzene, toluene, xylene, carbon tetrachloride, chloroform, ketones such as acetone and methyl ethyl ketone, anhydrous alcohol solvents and dioxane. It is preferable to use aromatic hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the dialkoxy dichloroethane, hydrogen chloride which is liberated is preferably sequestered by adding a material to combine with the hydrogen chloride as formed. The sequestering material may be added gradually to the reaction mixture. It is convenient to use pyridine for this purpose. However, in its place, other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the substituted dichloroethane as in Example 2. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive aromatic hydrocarbon solvents. When the free acid is reacted with the substituted dichloroethane, the alkaline material is preferably added gradually as needed but it can be added all at once if desired. Ammonia is suitably added gradually as a gas, the solids are suitably added in finely divided form.

The reaction of an alkyl mercaptan with glyoxal and a dialkyl dithiophosphoric acid is carried out by mixing the reagents in any desired order in the molecularly determined proportions as expressed by the equation above at a temperature in the range of 0 to 100° C. The glyoxal is generally used in an aqueous solution and an inert solvent such as dioxane may be added to effect homogeneity if needed.

The dithiophosphoric acid ester used in the above reactions is produced by reacting the lower aliphatic alcohol, which is to form a part of the ester, with $P_2S_5$, preferably in a nonreactive solvent such as benzene, toluene, xylene, carbon tetrachloride or chloroform, and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction. The esters of dithiophosphoric acid used in preparation of the compounds of this invention are thus made from individual alcohols or mixtures of alcohols having 1–4 carbon atoms. Included among such alcohols are methanol, ethanol, propanol-1, propanol-2, 2-methyl propanol-1, butanol-1 and butanol-2.

The methods by which the products of this invention are isolated will vary slightly with the reactants used and the product produced. In some instances, the chloride salt split out in the reaction separates and can be filtered off. In other instances, the chloride salt is best removed by washing with water. The excess salt of the ester of dithiophosphoric acid is also removed by the water wash. Solvents, if present, are then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in Aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion. The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, Second Edition (1948), pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts or sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will, in some instances, have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:
1. As a new composition of matter a compound of the formula

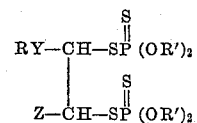

in which R is a radical of the group consisting of lower alkoxyethyl and lower alkyl radical and R' is a lower alkyl radical, Y is a member of the group consisting of sulfur and oxygen and Z is a member of the group consisting of hydrogen and RY.

2. As a new composition of matter a compound of the formula

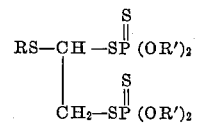

in which R and R' are lower alkyl radicals.

3. As a new composition of matter a compound of the formula

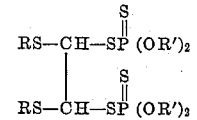

in which R and R' are lower alkyl radicals.

4. As a new composition of matter a compound of the formula

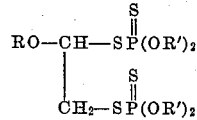

in which R and R' are lower alkyl radicals.

5. As a new composition of matter a compound of the formula

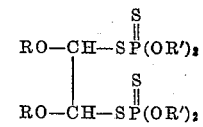

in which R and R' are lower alkyl radicals.

6. As a new composition of matter a compound of the formula

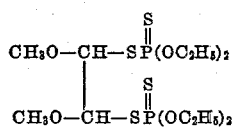

7. As a new composition of matter a compound of the formula

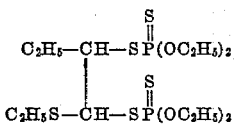

8. As a new composition of matter a compound of the formula

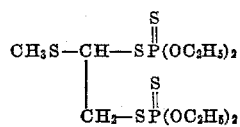

9. As a new composition of matter a compound of the formula

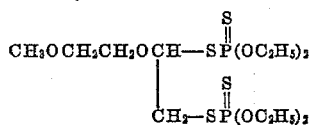

10. As a new composition of matter a compound of the formula

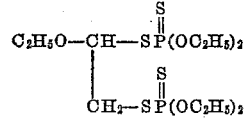

11. An insecticidal composition comprising the compound of claim 1 and an insecticidal carrier therefor.
12. An insecticidal composition comprising the compound of claim 2 and an insecticidal carrier therefor.
13. An insecticidal composition comprising the compound of claim 3 and an insecticidal carrier therefor.
14. An insecticidal composition comprising the compound of claim 4 and an insecticidal carrier therefor.
15. An insecticidal composition comprising the compound of claim 5 and an insecticidal carrier therefor.
16. An insecticidal composition comprising the compound of claim 6 and an insecticidal carrier therefor.
17. An insecticidal composition comprising the compound of claim 7 and an insecticidal carrier therefor.
18. An insecticidal composition comprising the compound of claim 8 and an insecticidal carrier therefor.
19. An insecticidal composition comprising the compound of claim 9 and an insecticidal carrier therefor.
20. An insecticidal composition comprising the compound of claim 10 and an insecticidal carrier therefor.

References Cited in the file of this patent

UNITED STATES PATENTS 1,949,629    Romieux et al.        Mar. 6, 1934

FOREIGN PATENTS 515,666    Canada        Aug. 16, 1955

UNITED STATES PATENT OFFICE
Certificate of Correction

Patent No. 2,833,805                                                                                 May 6, 1958

William R. Diveley

It is hereby certified that error appears in the printed specification of the above numbered patent requiring correction and that the said Letters Patent should read as corrected below.

Column 3, lines 42 to 44, for that portion of the formula reading $$S\overset{S}{\underset{\|}{P}}(OR)_3 \quad \text{read} \quad S\overset{S}{\underset{\|}{P}}(OR')_3$$

column 7, lines 14 to 17, claim 7, the left-hand portion of the formula should read as shown below instead of as in the patent—

$$\begin{array}{c} C_2H_5S-CH- \\ | \\ C_2H_5S-CH- \end{array}$$

Signed and sealed this 15th day of July 1958.

[SEAL]

Attest:
KARL H. AXLINE,
*Attesting Officer.*

ROBERT C. WATSON,
*Commissioner of Patents.*